April 13, 1954     A. P. GRAENZ     2,674,864
METHOD AND MECHANISM FOR KNITTING HOSIERY
Filed April 4, 1951     6 Sheets-Sheet 6

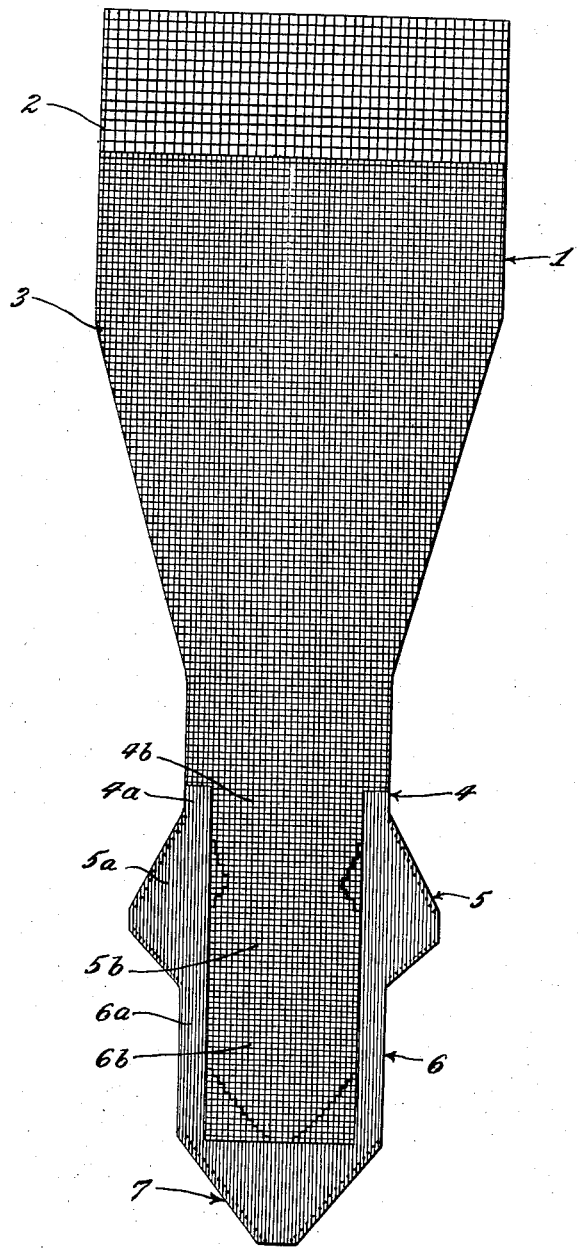

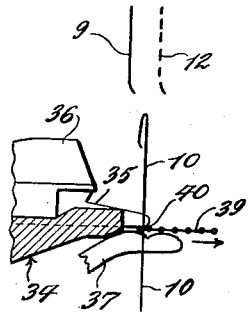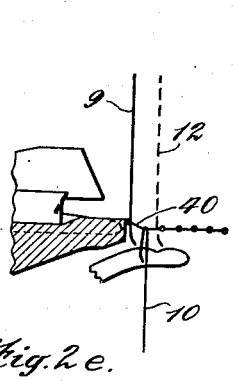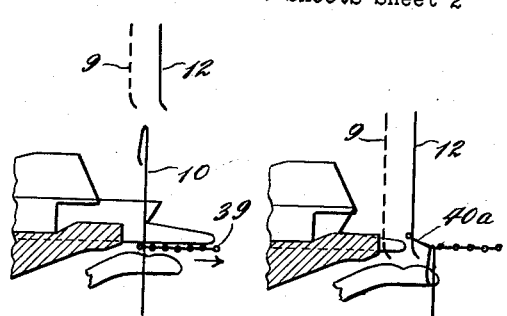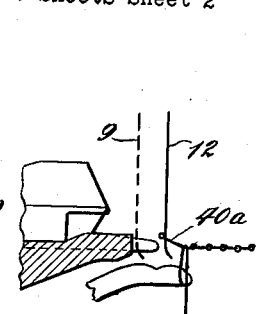
Fig.2a.    Fig.2e.    Fig.3a.    Fig.3e.
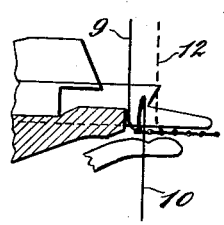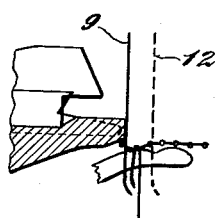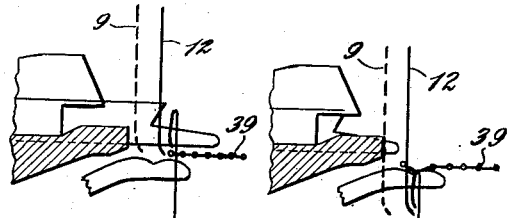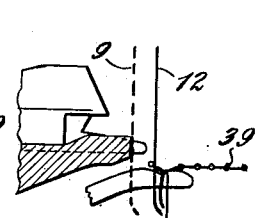
Fig.2b.    Fig.2f.    Fig.3b.    Fig.3f.
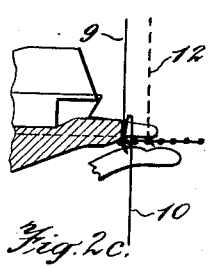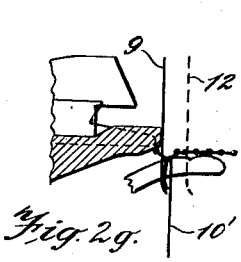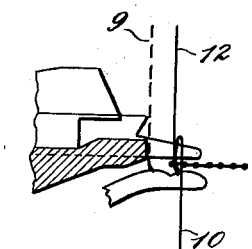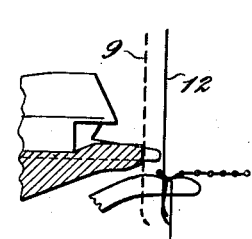
Fig.2c.    Fig.2g.    Fig.3c.    Fig.3g.
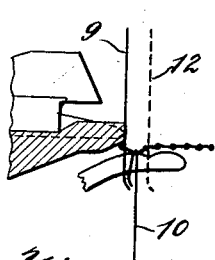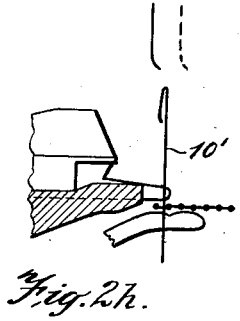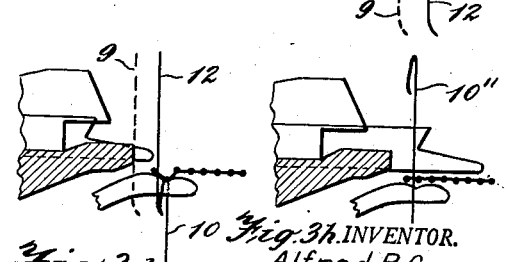
Fig.2d.    Fig.2h.    Fig.3d.    Fig.3h.
INVENTOR.
Alfred P. Graenz
BY
ATTORNEYS April 13, 1954     A. P. GRAENZ     2,674,864
METHOD AND MECHANISM FOR KNITTING HOSIERY
Filed April 4, 1951     6 Sheets-Sheet 3
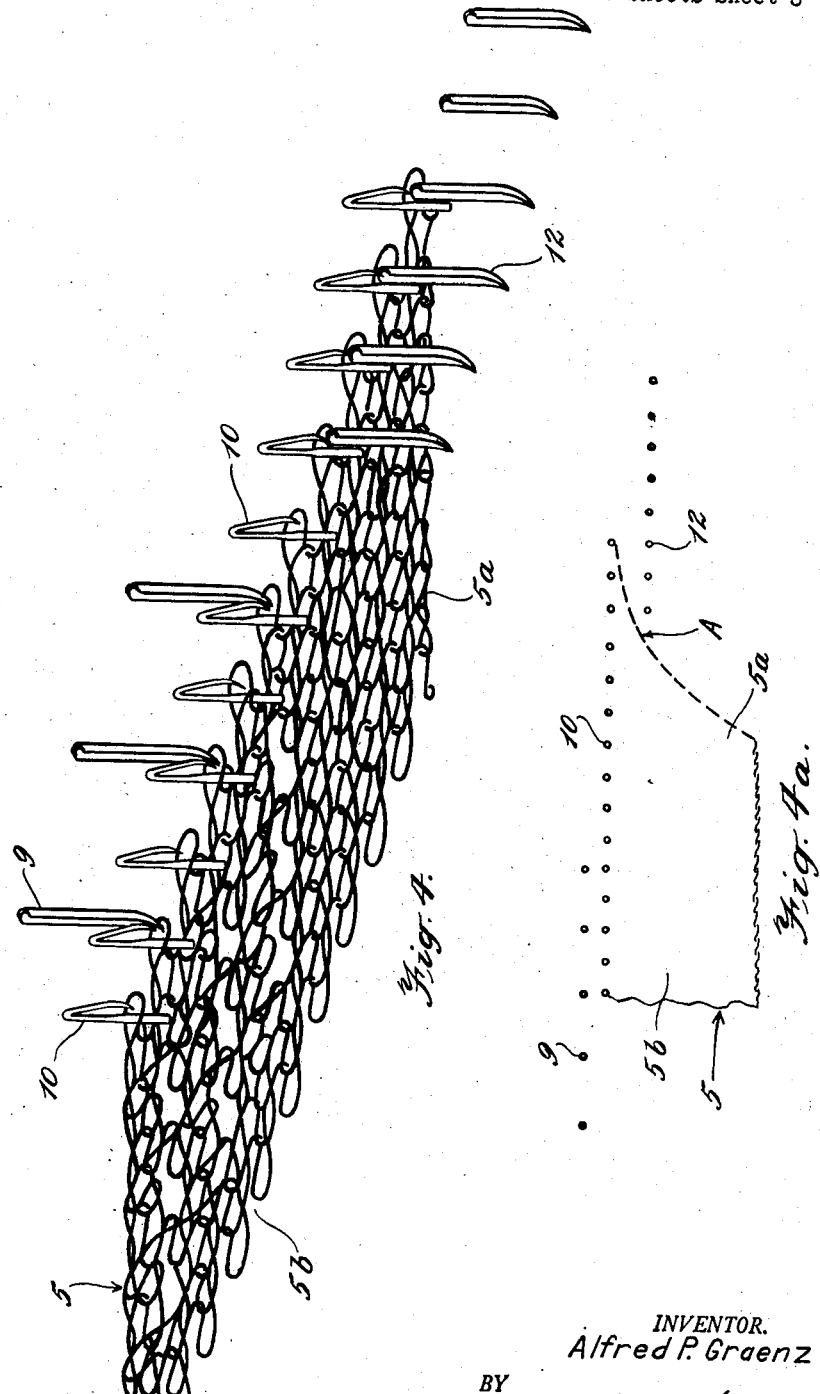
INVENTOR.
Alfred P. Graenz
BY
ATTORNEYS April 13, 1954    A. P. GRAENZ    2,674,864
METHOD AND MECHANISM FOR KNITTING HOSIERY
Filed April 4, 1951    6 Sheets-Sheet 4
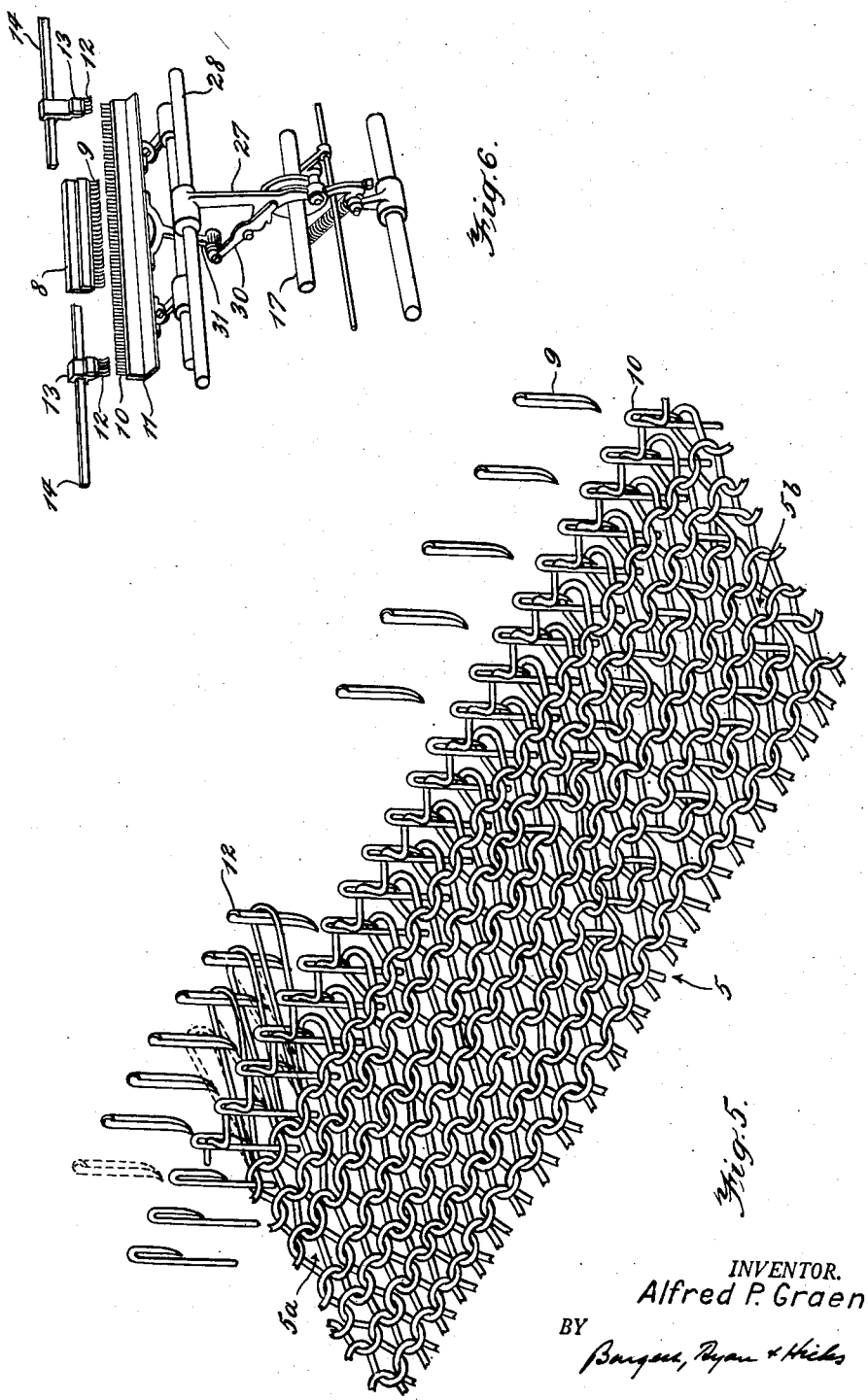
INVENTOR.
Alfred P. Graenz
BY
ATTORNEYS

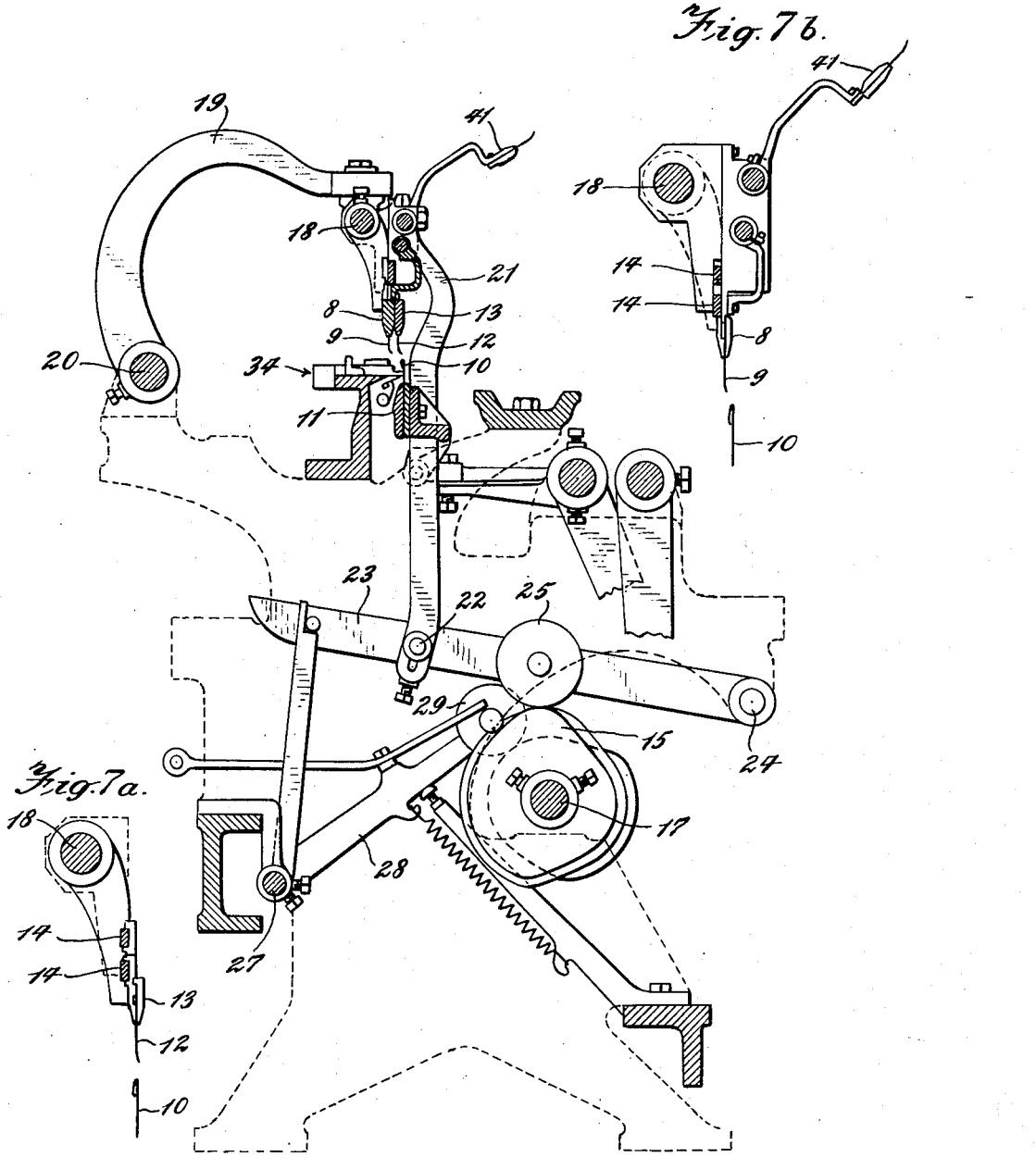

INVENTOR.
Alfred P. Graenz
BY
Bangere, Ryan & Hicks
ATTORNEYS

Patented Apr. 13, 1954

2,674,864

UNITED STATES PATENT OFFICE 2,674,864

METHOD AND MECHANISM FOR KNITTING HOSIERY

Alfred P. Graenz, Southampton, Pa.

Application April 4, 1951, Serial No. 219,192

7 Claims. (Cl. 66—89)

The present invention relates to a novel and improved method for making a knitted fabric, together with a mechanism which may be used in the practice of the method and relates more particularly to a method and apparatus for knitting fabric for full-fashioned hosiery.

The present invention provides a method and mechanism for knitting the fabric for full-fashioned hosiery wherein the courses and wales forming portions of the fabric are knit with non-run loops and plain loops with the selvage edges of such portions of the fabric being widened or narrowed as required. Thus, the present invention makes it possible to knit the entire fabric including such portions for a complete stocking blank on a single knitting without the necessity for a transfer operation.

The various objects and advantages of the present invention will be apparent and best understood from the following description and the accompanying drawings in which:

Fig. 1 is a plan view of the fabric for a full-fashioned stocking knit in accordance with the method of the present invention, and on mechanism embodying the present invention;

Figs. 2a to 2h, inclusive, are diagrammatic views in the form of sections through the sinker head and associated mechanism and illustrating successive steps in knitting portions of the fabric of the stocking blank shown in Fig. 1;

Figs. 3a to 3h, inclusive, are diagrammatic views in the form of sections through the sinker head and associated mechanism and illustrating successive steps in knitting other portions of the fabric of the stocking blanks shown in Fig. 1;

Fig. 4 is a perspective view of a portion of the fabric of the stocking blank shown in Fig. 1 showing the narrowing points positioned behind the needles on which the fabric is being knit and the locking points in operating position;

Fig. 4a is a diagrammatic plan view showing a portion of the fabric illustrated in Fig. 4 and the relative positions of the needles, the locking points and the narrowing points with respect to each other and the fabric;

Fig. 5 is a perspective view of a portion of the fabric of the stocking blank shown in Fig. 1 showing the narrowing points in operation;

Fig. 6 is a perspective view of a portion of a knitting machine embodying the present invention for knitting the fabric of the stocking blank shown in Fig. 1;

Figs. 7 and 8 are vertical section views (on different planes) of a knitting machine embodying the present invention for knitting the fabric of the stocking blank shown in Fig. 1; and Figs. 7a and 7b are fragmentary views in section illustrating portions of the machine shown in Fig. 7 on an enlarged scale.

Figure 8:
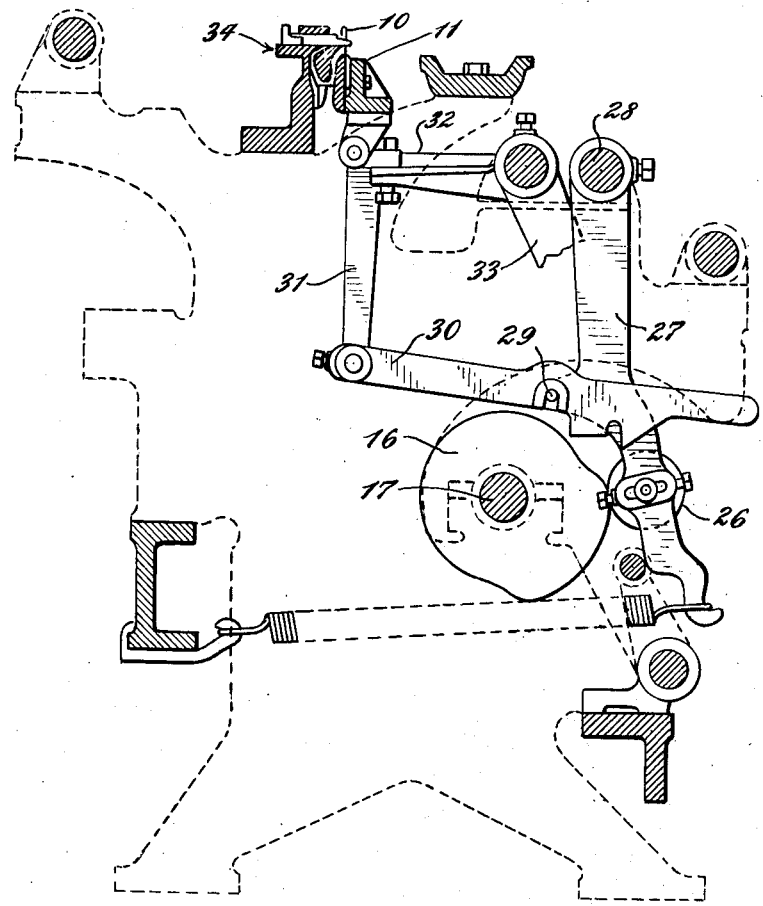

The present invention may be applied to and carried out on flat knitting machines of the type customarily used for knitting the fabric for full-fashioned hosiery and for the purposes of illustration, the present invention has been shown and described with reference to the machines and methods disclosed in United States Patents Nos. 1,856,053 granted to me on April 26, 1932; 1,862,514 granted to me on June 7, 1932; and 2,066,682 granted to me on January 5, 1937, to which reference may be made for a more complete description of such machines and their operation. Such patents and the mechanisms described therein pertain particularly to the knitting of non-run fabrics for hosiery.

In Fig. 1, the fabric for a full-fashioned stocking blank 1 is illustrated and exemplifies the type of fabric that may be knit in accordance with the present invention. The stocking blank 1 has a welt 2 and a leg 3 which may be knit in the usual manner preferably with non-run loops as described in my previously mentioned patents. A high heel or ankle 4 joins the leg to a foot consisting of a heel and instep 5, a foot sole and top 6 and a toe 7. Starting at the high heel or ankle 4 and extending to the toe 7, the wales and courses forming the center portion of the fabric are knit with non-run loops and the wales and courses forming the side portions of the fabric are knit with plain loops.

The portions of the high level heel or ankle 4 knit with plain loops are indicated at 4a and the portion knit with non-run loops is indicated at 4b. In the heel and instep 5, the heel pockets 5a, which are widened and narrowed at their outer edges, are knit with plain loops and the instep 5b is knit with non-run loops. In the foot sole and top 6, the sole 6a is knit with plain loops and the top 6b is knit with non-run loops. The toe 7 is knit entirely with plain loops.

The purpose of knitting the fabric in which certain courses have wales knit with plain loops and wales knit with non-run loops is to provide greater elasticity in the fabric than is obtained in a fabric in which the courses and wales are knit entirely with non-run loops so that a stocking made from such fabric will conform better to the ankle and foot of the wearer. Such fabrics have been known and used previously, but prior to the present invention, it was necessary to knit such a fabric on two machines. For example, in knitting such a fabric for a stocking the welt, the leg and the heel pockets were knit on a machine known as a "legger." In the legger," the heel pockets were knit as strips extending from the leg in order that they might be widened and narrowed as required. The fabric knit on the "legger" was then transferred to a machine known as a "footer" on which the instep, the foot sole and top and the toe were knit. This was the manner in which the stockings illustrated in my previous patents were knit and as a result of the heel pockets being knit in strips, they were in the form of loops or flaps in the finished blank.

In contrast to this, the present invention provides for knitting the entire stocking blank 1 in a continuous operation on one machine without a transfer operation. After the welt 2 and leg 3 have been knit in the usual manner as described in my previous patents, the non-run bar 41 employed in such knitting is raised (see Figs. 7 and 7b) and a second non-run bar 8 is then lowered or placed in operating position. When the second non-run bar 8 is in operating position, a row of locking points 9 carried thereon are supported in position to cooperate with a group of needles in the center of a row of needles 10 in a needle bar 11, as shown in Figs. 6, 7 and 8, in knitting the front of the ankle 4b, the instep 5b and the top of the foot 6b with non-run loops. The back of the ankle 4a, the heel pockets 5a and the sole of the foot 6a are knit with plain loops on needles of the row of needles 10 located at either side of the group of needles with which the locking points 9 cooperate.

The needles 10 which are mounted in a row on the needle bar 11 are of the spring beard type and the needle bar 11 is reciprocated vertically and horizontally by the usual mechanism so that the needles 10 will catch a thread and pull it through previously formed loops.

When the second non-run bar 8 is placed in its operating position, a set of narrowing points 12 is also placed in position to cooperate with the needles 10 at each end of the row of needles on which the fabric is being knit. Each set of narrowing points 12 is carried by a narrowing finger 13 which is supported on a flat rod 14 by means of which the narrowing points 12 may be moved, as required, to the right or left (at right angles to the plane of Figs. 7 and 8 of the drawings) through the operation of the usual narrowing head mechanism which is well known in the art and need not be described in detail here. In addition to being spaced laterally from each end of the row of the locking points 9 on the non-run bar 8, the narrowing points 12 are also spaced transversely with respect to the locking points 9 so that they are positioned ahead of the locking points 9 and to the rear of the needles 10, as indicated in Fig. 4a and also in Figs. 2 and 3. The distance that the narrowing points 12 are spaced to the rear of the needles 10 should be equal to or slightly greater than the length of loops that are drawn by the needles 10 during the knitting of this portion of the fabric so as to prevent the narrowing points from striking the needles or otherwise interfering with movement of the needles when loops are being formed thereon.

In order to prevent the narrowing points 12 which are to the rear of the needles 10 from damaging the fabric that has been knit as it leaves the needles, only a limited number of the narrowing points 12 overlap or are behind needles on which the fabric is being knit. As the fabric leaves the needles and is taken up from the needles by the usual take-up roll, the tension across (or coursewise of) the fabric is released and the edges of the fabric that has been knit have a tendency to curl inwardly as indicated at A in Fig. 4a. This inward curling of the fabric at its edges will generally reduce the width of the fabric at a point immediately behind the needles for a distance of from two to five needles. This will depend on the gauge and nature of the thread being knit. By taking advantage of this, the narrowing points 12 can be positioned behind so that they overlap and are behind the first two to five needles at the ends of the row of needles on which the fabric is being knit without striking the fabric as the knitting operations continue. In actual practice, I have found it satisfactory to have three of the narrowing points 12 behind or in overlapping relation to the three end needles 10 on which the fabric is being knit.

Due to the narrowing points 12 being positioned to the rear of the needles 10, it is also necessary to move the needle bar 11 to the rear at times when the narrowing points are employed to pick up and transfer loops from the end needles 10 to adjoining needles during widening or narrowing of the fabric. The required movements of the needle bar 11 and the narrowing points in co-operation therewith are obtained by means of a suitably shaped narrowing cam 15 (see Fig. 7) and a suitably shaped press cam 16 (see Fig. 8) both of which are carried on the cam shaft 17 of the machine. The cams 15 and 16 control movements of the narrowing points 12 and the needle bar 11, respectively, and they are placed in operation during the knitting by the usual pattern chain mechanism provided in such machines for shifting the cam shaft at appropriate times.

Aside from the features mentioned above, the mechanism shown in Figs. 7 and 8 are in general well known in the art and will be described only briefly here. Referring to Fig. 7, the rods 14 carrying the narrowing fingers 13 and the non-run bar 8 are both supported from a shaft 18. The shaft 18 is secured to an arm 19, which in turn is secured to a rock shaft 20 that is mounted in bearings on the frame of the machine. The arm 19 and the shaft 20 are rocked to give the required vertical reciprocation of the narrowing points 12 (or the locking points 9, as the case may be) by a link 21 that is connected to the shaft 18. The link 21 is pivoted at 22 on a lifting lever 23 which is pivoted at 24 on the frame of the machine. The lifting lever 23 carries a cam follower 25 intermediate its ends which engages with the narrowing cam 15 when the narrowing points are in operation (or with a non-run cam when the locking points are in operation). The cam 15 is appropriately shaped to raise and lower the narrowing points 12 to cooperate with the needles 10 and to pick up and transfer loops during the narrowing or widening of the fabric.

The horizontal movements of the needle bar 11 are produced by the mechanism shown in Fig. 8. When the needles 10 cooperate with the narrowing points 12, the movement of the needles is controlled by the press cam 16 and when the group of needles in the center of the needle bar cooperate with the locking points 9, the movement of the needles is controlled by a second press cam in the usual manner. A roller 26 that is carried on a lever 27 engages with the cam 16. The lever 27 is secured to a rock shaft 28 and carries a pin 29 that engages with a needle bar rocker arm 30.

The needle bar 11 is connected to the needle bar rocker arm 30 by a link 31 and is reciprocated horizontally by movement of the needle bar rocker arm 30 in response to movement of the lever 27 under the influence of the cam 16. The vertical movements of the needle bar 11 are transmitted thereto in the usual manner through the customary mechanisms which include the levers 32 and 33 shown in Fig. 8.

The sequence of steps in knitting portions of the fabric where the selvage edges of the fabric are to be widened or narrowed as at the side edges of the heel pockets 5a will now be described with particular reference to Figs. 2a to 2b and 3a to 3b, inclusive, and in considering these figures reference may also be had to Figs. 4 and 5.

First, a series of successive courses and wales of loops are formed with selected loops forming the wales in the center of the fabric being displaced from one wale in one course to another wale in the succeeding course. The successive steps in forming the non-run loops in these courses are shown in Figs. 2a to 2h, inclusive. In these figures the needle 10 shown is one of the group of needles in the needle bar 11 which cooperate with the locking points 9 and the position of the narrowing points 12 is indicated by dotted lines. The usual sinker head assembly 34, which includes a sinker 35, a divider 36 and a knockover bit 37, is shown in association with the needle 10 and these elements are operated in the usual manner. The fabric being knit is indicated at 39 and is moving in the direction indicated by the arrow.

Starting with Fig. 2a, the last row of loops, indicated at 40, is in position on the knocking over bits 37 and the needles 10 are raised so that they extend through the loops 40. The locking points 9 and the narrowing points 12 are also raised at this time.

Upon movement of the thread carrier (not shown) the sinkers and dividers are advanced and the needle 10 is lowered to engage the thread that is to form the new loops, as indicated in Fig. 2b. The locking points 9 and the narrowing points 12 are also lowered and at this time the locking points 9 are in front of the needles 10 in position to engage the spring beards thereof. Upon further downward movement of the needles 10 and the locking points 9, the needles 10 are brought into engagement with the locking points and presser edge of the sinker head assembly and the needles and the locking points pass through the loops 40, as shown in Fig. 2c. The needles 10 and the locking points 9 are then continued to be lowered and the locking points 9 engage with and hold the loops 40 tight so that such loops are drawn out as the needles 10 are moved to the rear as indicated in Figs. 2d and 2e. The result of this is that the loops 40 held by the locking points are drawn out in order that they will extend into the next course of the fabric when a new series of loops is formed.

The locking points 9 and the needles 10 are then raised slightly, as shown in Fig. 2e so that the locking points with the drawn-out loops 40 held thereon will clear the knock over bits and can be shifted transversely to transfer these loops each from one wale in one course to another wale in the succeeding course respectively as indicated in Fig. 4. After such transfer, the transferred loops are then knit into different wales of the fabric in the following course.

The locking points 9 and the needles 10 are then lowered once more, as indicated in Fig. 2f, and the needles 10' are moved into engagement with the locking points as indicated in Fig. 2g to complete the transfer of the loops. The locking points and the needles are then raised to their initial heights as shown in Figs. 2h and 2a.

It will be noted that during the operation of the locking points, the narrowing points 12 (indicated by the dotted lines) are moved with the locking points, but since they are spaced to the rear of the needles by a distance greater than the needle movement and they overlap or are behind only three needles, they do not strike or interfere with the movement of the needles 10 and they do not hit the fabric.

After a desired number of courses have been formed in the foregoing manner, the selvage edges of the fabric are then widened or narrowed as desired. The successive steps that take place in narrowing or widening the selvage edges of the fabric are shown in Figs. 3a to 3h. In these figures, the needles 10, the locking points 9 (indicated by dotted lines) and the narrowing points 12 (shown in full lines) are also shown in association with the usual sinker head assembly 34 and the fabric 39.

In Fig. 3a, the needles 10 and the locking points 9 and the narrowing points 12 are shown in a raised position. In order to position the needles to cooperate with the narrowing points, they are then moved to the rear as they are lowered so that the needles are behind the narrowing points, as shown in Fig. 3b. The beards of the needles are then brought into engagement with the narrowing points (by the press cam 16) as the needles and the narrowing points continue to be lowered and as they pass through the loops 40a of the fabric that are on the needles, as shown in Figs. 3c and 3d. The loops 40a are thus held on the narrowing points and the narrowing points are then raised slightly as indicated in Fig. 3e so that the loops 40a may be transferred inwardly or outwardly as the case may be. In transferring the loops, the narrowing points and the loops 40a held thereon are moved transversely with respect to the needles on which the loops were formed by the narrowing head mechanism as indicated in Fig. 5 and thereafter, the narrowing points are again lowered to place the loops 40a onto the new needles 10'' which the narrowing points are now in front of, as shown in Figs. 3f and 3g. The narrowing points and the needles are then raised to their initial height as shown in Fig. 3h.

During the transfer of the loops at the edges of the fabric by the narrowing points, the carrier does not operate so that a new course of the fabric is not being knitted at this time, but thereafter the knitting of courses of the fabric which have wales knit with plain loops at the sides thereof and wales knit with non-run loops in the center thereof is repeated before the next operation of the narrowing points.

The toe 7 of the stocking is to be knit entirely of plain loops and when it is knit, the non-run bar 8 is raised from its operating position and the knitting of the toe 7 is carried out in the usual manner.

For the purposes of illustration, I have shown and described my invention in conjunction with the knitting of a specific article and specific mechanism for practicing my invention, but it will be understood that various changes in both the method and mechanism may be made, without departing from the scope of the invention, and therefore, I do not intend to limit myself except by the appended claims.

I claim:

1. In a knitting machine of the character described which has a needle bar having a row of needles mounted thereon and mechanisms associated with said needles for forming courses and wales of interconnected loops of thread, the combination comprising a row of locking points positioned for cooperation with a group of needles in the center of said row of needles, a set of narrowing points positioned for cooperation with needles of said row of needles spaced from each end of the group of needles, said narrowing points being positioned ahead of the locking points and in back of the needles with which the narrowing points engage, means for moving the needles through loop-forming movements in conjunction with the locking points and means for moving the needles through loop transferring movements with said narrowing points.

2. In a knitting machine of the character described which has a needle bar having a row of needles mounted thereon and mechanism associated with said needles for forming courses and wales of interconnected loops of thread, the combination of a row of locking points positioned to cooperate with the row of needles in the needle bar, said row of locking points being movable into and out of said position, a second row of locking points positioned to cooperate with a group of the needles in the center of the row of needles in the needle bar and being movable into and out of operating position, a set of narrowing points spaced from each end of the second row of locking points, said narrowing points being positioned ahead of the locking points and in back of needles in the row of needles spaced from each end of the group of needles with which the second row of locking points engage, cam means for moving the needles and needle bar in cooperation with the first and second rows of locking points, cam means for moving the needles and the needle bar in cooperation with the narrowing points, cam means for moving the first and second rows of locking points in cooperation with the needles and cam means for moving the narrowing points in cooperation with the needles.

3. In a knitting machine of the character described which has a needle bar having a row of needles mounted thereon and mechanisms associated therewith for forming courses and wales of interconnected loops of thread, the combination of a row of locking points positioned for cooperation with a group of needles in the center of the needle bar, said row of locking points being parallel with and in front of the row of needles and narrowing points positioned for cooperation with needles in said row of needles spaced from each end of said group of needles, said narrowing points being positioned ahead of the row of locking points and in back of the needles with which they cooperate.

4. In a knitting machine of the character described which has a needle bar having a row of needles mounted thereon and mechanisms associated therewith for forming courses and wales of interconnected loops of thread, the combination of a row of locking points positioned for cooperation with a group of needles in the center of the needle bar, said row of locking points being parallel with and in front of the row of needles and narrowing points positioned for cooperation with needles in said row of needles spaced from each end of said group of needles, said narrowing points being positioned ahead of the locking points and in back of not more than five of the needles on which loops are being formed.

5. In a knitting machine of the character described which has a needle bar having a row of needles mounted thereon and mechanisms associated therewith for forming courses and wales of interconnected loops of thread, the combination of a row of locking points positioned for cooperation with a group of needles in the center of the needle bar, said row of locking points being parallel with and in front of the row of needles, narrowing points positioned for cooperation with needles in said row of needles spaced from each end of said group of needles, said narrowing points being positioned ahead of the locking points and in back of not more than five of the needles on which loops are being formed and a common linkage for operating the locking points and the narrowing points.

6. In a knitting machine of the character described having a needle bar with a row of needles supported thereon and mechanisms associated with the needle bar and needles for forming successive courses and wales of interconnected loops, the combination comprising means for knitting a series of successive courses of the fabric with non-run loops, said means including a set of locking points located on one side of and cooperating with selected needles of the row of needles, a second set of locking points cooperating with a number of the selected needles of the row of needles and sets of narrowing points positioned for cooperation with needles at the ends of said row of needles, said narrowing points being located on the other side of the row of needles and being spaced from the locking points and means to shift the row of needles into position for operation with the narrowing points.

7. In a knitting machine of the character described having a needle bar with a row of needles supported thereon and mechanisms associated with the needle bar and needles for forming courses and wales of interconnected loops, the combination as defined in claim 6 wherein the narrowing points cooperate with not more than five of the needles at each end of the row of needles on which fabric is being knit.

References Cited in the file of this patent

UNITED STATES PATENTS

| Number | Name | Date |
|---|---|---|
| 1,856,053 | Graenz | Apr. 26, 1932 |
| 1,862,514 | Graenz | June 7, 1932 |
| 1,962,614 | Peters | June 12, 1934 |
| 1,971,725 | Muller | Aug. 28, 1934 |
| 2,066,682 | Graenz | Jan. 5, 1937 |
| 2,107,985 | Heinitz | Feb. 8, 1938 |
| 2,270,853 | Sheeler | Jan. 27, 1942 |
| 2,330,681 | Cobert | Sept. 28, 1943 |

FOREIGN PATENTS

| Number | Country | Date |
|---|---|---|
| 645,188 | Germany | May 24, 1937 |
| 711,933 | Germany | Oct. 9, 1941 |